United States Patent Office 2,936,292
Patented May 10, 1960

2,936,292

HALOGENATED DIEPOXIDE COMPOSITIONS

Charles W. McGary, Jr., and Charles T. Patrick, Jr., South Charleston, W. Va., assignors to Union Carbide Corporation, a corporation of New York No Drawing. Application June 4, 1957
Serial No. 663,354

10 Claims. (Cl. 260—2)

This invention relates to halogenated diepoxide compositions. In one aspect this invention relates to the production of polymers of halogenated diepoxide compounds. In another aspect this invention relates to polymerizable, curable compositions comprising halogenated diepoxide compounds and to the polymerized, cured compositions resulting therefrom.

The curable, polymerizable compositions of this invention are low viscosity liquids ranging upwards from room temperatures. These compositions can be admixed with a wide variety of fillers and pigments, if desired, to adjust the composition viscosity and at the same time enhance the physical properties of resins formed therefrom. These compositions can be easily handled in resin-forming applications such as in the coatings, bonding, laminating, molding, casting and potting arts, without the need of organic solvents or diluents although such solvents or diluents can be employed, if desired.

The cured, polymerized compositions of this invention are infusible solids having properties which particularly lend their use to many applications in the synthetic resins art. The cured compositions can be shaped by molding or casting, as desired, into a myriad of useful articles. They can be machined and polished to give shaped articles having smooth and polished surfaces. A paramount characteristic of the cured, polymerized compositions of this invention is their flame-resistant property which these compositions exhibit when subjected to a torch or flame and the like. This unexpected property enhances the usefulness of the cured compositions to fields of application which are normally closed to flammable-type resins.

One embodiment of this invention is directed to curable compositions containing a particular class of hologenated diepoxides and catalysts and to the cured compositions resulting therefrom. The halogenated diepoxides which are contemplated can be characterized by the following structural formula:

I
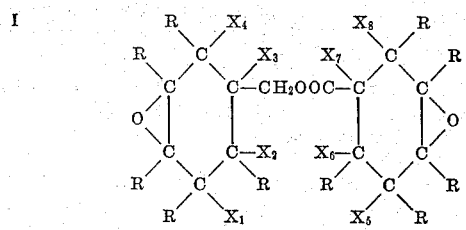

wherein each R is individually selected from the group consisting of hydrogen and an aliphatic hydrocarbon radical, preferably an alkyl radical such as methyl, ethyl, propyl, butyl and the like; $X_1$ through $X_8$ are selected from the group consisting of hydrogen, halogen, preferably chlorine and bromine, and an aliphatic hydrocarbon radical, preferably an alkyl radical such as methyl, ethyl, propyl, butyl, and the like; and at least one of the variables designated as $X_1$ through $X_8$ always being a halogen. In a preferred embodiment at least one pair of the corresponding variables designated from $X_1$ through $X_8$ such as $X_1$ and $X_5$, $X_2$ and $X_6$, $X_3$ and $X_7$, $X_4$ and $X_8$, will always be a halogen such as chlorine and bromine. It is still further preferred that when any of the above variable represent alkyl radicals, particularly lower alkyl radicals, the total number of carbon atoms contained in said alkyl groups per carbocyclic ring does not exceed twelve.

The halogenated diepoxides, i.e., halogenated (3,4-epoxycyclohexan-1-yl)methyl 3,4-epoxycyclohexanecarboxylates, useful as starting material in this invention can be prepared in the following manner. An aliphatic conjugated diene having the following structural group II
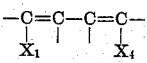

and an alpha, beta-unsaturated aliphatic aldehyde characterized by the structural group III
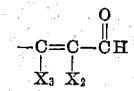

are subjected to the well-known Diels-Alder reaction to produce the cyclic unsaturated aldehyde. In Formulas II and III above at least one of the variables $X_1$, $X_2$, $X_3$ and $X_4$ is a halogen such as chlorine and bromine, and the remaining variables are hydrogen or an aliphatic hydrocrabon radical, preferably an alkyl radical such as methyl, ethyl, propyl, butyl, and the like. The open bonds likewise can be to a hydrogen atom or to an aliphatic hydrocarbon radical, preferably an alkyl radical. The resulting halogen-substituted cyclic unsaturated aldehyde which is characterized by the following structural formula IV
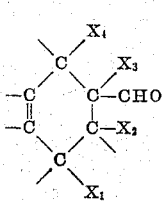

then can be subjected to the well recognized Tischenko reaction in the presence of an aluminum alkoxide catalyst so that two molecules of aldehyde (Formula IV) react to produce the halogen-substituted diunsaturated ester. Oxirane oxygen can be introduced at the site of both carbon-carbon double bonds by reacting the above-said diunsaturated ester with peracetic acid at a temperature in the range from about 20° to 50° C. The halogenated diepoxide compound obtained from the epoxidation process is shown in Formula I above. The preparation of the halogenated diepoxides, i.e., halogen-substituted (3,4-epoxy-cyclohexan-1-yl)methyl 3,4-epoxycyclohexanecarboxylates, is the subject matter of copending application of H. R. Guest and H. A. Stansbury, Jr., entitled "Halogenated Diepoxide Compounds," Serial No. 663,342, filed June 4, 1957, now U.S. Patent No. 2,874,167, and assigned to the same assignee as the instant application. A more detailed description of the preparation of the halogenated diexopxide compound can be had by referring to the above-said copending application.

Illustrative halogenated (3,4 - epoxycyclohexan-1-yl)-methyl 3,4-epoxycyclohexanecarboxylates which can be employed in the curable and cured compositions of this invention include, among others (1-chloro-3,4-epoxycyclohexan-1-yl)methyl 1-chloro-3,4-epoxycyclohexanecarboxylate, (1-bromo-3,4-epoxycyclohexan-1-yl)methyl 1-bromo-3,4-epoxycyclohexanecarboxylate, (1 - fluoro - 3,4-epoxycyclohexan-1-yl)methyl 1-fluoro-3,4-epoxycyclohexanecarboxylate, (2-chloro-3,4 - epoxycyclohexan - 1 - yl)-methyl 2-chloro-3,4-epoxycyclohexanecarboxylate, (5-bromo-3,4-epoxycyclohexan-1-yl)methyl 5-bromo-3,4-epoxycyclohexanecarboxylate, (6-chloro-3,4-epoxycyclohexan-1-yl)methyl 6-chloro-3,4 - epoxycyclohexanecarboxylate, (1-chloro-2-methyl-4,5-epoxycyclohexan-1 - yl)methyl 1-chloro-2 - methyl - 4,5 - epoxycyclohexanecarboxylate, (1-bromo-2,6-dimethyl-4,5-epoxycyclohexan-1-yl)methyl 1-bromo-2,6-dimethyl-4,5-epoxycyclohexanecarboxylate, (2-chloro - 2 - methyl - 3 - ethyl - 4,5 - epoxycyclohexan - 1-yl)methyl 2 - chloro - 2 - methyl - 3 - ethyl - 4,5 - epoxycyclohexanecarboxylate, (6 - bromo - 2 - ethyl - 3 - propyl - 4,5 - epoxycyclohexan - 1 - yl)methyl 6 - bromo - 2-ethyl-3-propyl-4,5-epoxycyclohexanecarboxylate and the like.

The catalysts which have been found to be particularly useful in preparing the novel homopolymers are the acid catalysts and preferably the Lewis acid catalysts. Typical Lewis acids include, among others, boron trifluoride, stannic chloride, zinc chloride, aluminum chloride, ferric chloride, and the like. Complexes of the various Lewis acids, such as the etherates and aminates of boron trifluoride are also effective. Other acid catalysts which can be employed include the mineral acids such as sulfuric acid, phosphoric acid, perchloric acid, polyphosphoric acid, and the like; the various sulfonic acids such as toluenesulfonic acid, benzenesulfonic acid, and the like.

The catalyst is employed in catalytic quantities and, in general, a catalyst concentration in the range from about 0.005 to about 10.0 percent by weight, based on the weight of the halogenated diepoxide, is suitable. Higher catalyst concentrations above this range are also effective. Various factors such as the particular acid catalyst and halogenated diepoxide compound employed, the temperature of the polymerization reaction, etc., will determine, to an extent, the optimum catalyst concentration.

The curable compositions can be prepared by adding the above-described catalyst to the halogenated (3,4-epoxy-cyclohexan-1-yl)methyl 3,4-epoxycyclohexanecarboxylate and agitating this mixture to make it homogeneous. The composition then can be cured at a temperature in the range from about 25° to 250° C. for a period of time ranging from several minutes to 24 hours and longer. The cure period will depend upon various considerations such as the temperature, halogenated diepoxide, catalyst, the amounts of catalyst and halogenated diepoxide employed, etc. In general, the higher the cure temperature, the shorter the cure period. In a preferred method the curable composition can be formed at a temperature in the range from about 0° to about 30° C. The mixture then can be brought to and maintained at a temperature range from about 50° to 160° C., until a gel, or partially cured product, is formed. After formation of the gel, the temperature can then be maintained within the range from about 100° to 250° C. to complete the cure. Many combinations of temperatures or a single temperature, all preferably within the range from about 25° to 250° C., can be used in the curing process.

Uniform dispersion of catalyst in the halogenated (3,4-epoxycyclohexan-1-yl)methyl 3,4 - epoxycyclohexanecarboxylate prior to curing has been found to be desirable in order to obtain homogeneous resins and to avoid localized curing around catalyst particles. Agitation of the compositions containing the halogenated diepoxide and catalyst is sufficient when the catalyst is miscible with said halogenated diepoxide. When the catalyst is immiscible in the halogenated diepoxide, the catalyst can be added as a solution in a suitable solvent. Illustrative solvents include organic ethers, e.g., diethyl ether, dipropyl ether, 2-methoxy-1-propanol and the like; organic esters, e.g., methyl acetate, ethyl acetate, ethyl propionate and the like; organic ketones, e.g., acetone, methyl isobutyl ketone, cyclohexanone and the like; organic alcohols, e.g., methanol, cyclohexanol, propylene glycol, and the like. The mineral acids can be employed as solutions in water; the metal halide Lewis acids tends to decompose in water, and consequently, aqueous solutions of such Lewis acids are not preferred.

While not wishing to be bound by any particular theory, or mechanics of reaction, it is believed that the curing reaction involves the etherification of epoxy groups,

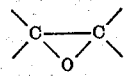

to form carbon to oxygen to carbon bonds linking and cross-linking the monomeric molecules. Thus, the cured resins can be characterized as having recurring interconnected units of the following formula:

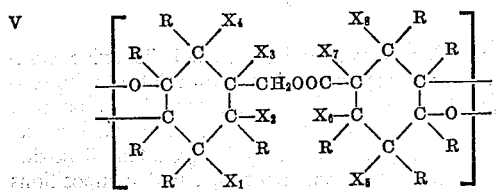

wherein the variables R and $X_1$ through $X_8$ have the same meanings as defined in Formula I above. The homopolymers are suitable for use in castings which can be machined to make a variety of useful products such as buttons, handles for tools, and the like. These polymers are also useful as adhesives, coatings, molding compositions and the like. In addition, these polymers have been found to have flame-resistant characteristics, which characteristics are very desirable in certain molded articles.

Another embodiment of the present invention is directed to polymerizable, curable compositions comprising (a) a halogenated diepoxide compound of the type characterized by Formula I above, and (b) a polycarboxylic acid anhydride, preferably a dicarboxylic acid anhydride, in an amount so as to provide from about 0.1 to 4.0 carboxyl groups of anhydride per epoxy group of diepoxide. These halogenated diepoxide-polycarboxylic acid anhydride systems can be further modified, so as to obtain a variety of useful physical properties, by the inclusion or addition of a polycarboxylic acid compound, such as polycarboxylic acids and acid esters, in an amount so as to provide up to 1.0 carboxyl group of acid compound per epoxy group of diepoxide.

The polymerizable, curable halogenated diepoxide-polycarboxylic acid anhydride system, modified or unmodified with a polycarboxylic acid compound, can be expressed as compositions comprising (a) a halogenated diepoxide of the type characterized by Formula I above, (b) a polycarboxylic acid anhydride in an amount having $x$ carboxyl equivalents per epoxy equivalent of said diepoxide, and (c) a polycarboxylic acid compound in an amount having $y$ carboxyl equivalents per epoxy equivalent of said diepoxide, wherein $x$ is a number in the range from about 0.1 to 4.0, preferably from about 0.5 to 2.0; $y$ is a number in the range from 0.0 to 1.0; the sum of $x$ and $y$ is not greater than 4.0, preferably not greater than 2.0; and $x/y$ is at least 1.0.

The proportions of the reactants are preferably expressed in terms of available carboxyl groups or carboxyl equivalent per available epoxy group or epoxy equivalent. Accordingly, by the term "carboxyl equivalent" as herein employed, is meant the number of carboxyl groups contained by an amount of polycarboxylic compound. For example, the "carboxyl equivalent" of a dicarboxylic acid is two. In the case of a dicarboxylic acid anhydride, the term "carboxyl equivalent" is meant to indicate the number of carboxyl groups which would be contained by an amount of the corresponding dicarboxylic acid. Thus, for example, one mole of a dicarboxylic acid anhydride would have a "carboxyl equivalent" of two. Also, as employed herein, the term "epoxy equivalent" is intended to represent the number of epoxy groups,

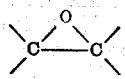

contained by an amount of epoxide compound. Thus, in the diepoxide-polycarboxylic acid anhydride systems, modified or unmodified by the addition of a polycarboxylic acid compound, the terms $x$ and $y$ are employed to signify carboxyl equivalents of the anhydride and acid compound, respectively, per epoxide equivalent. Thus, since it has been discovered that useful compositions are obtained by employing amounts of polycarboxylic acid anhydride and halogenated diepoxide so as to provide from about 0.1 to 4.0 carboxyl equivalents of anhydride per epoxy equivalent of diepoxide, and consequently, $x$ will be a number in the range from about 0.1 to 4.0. Upon the addition, if desired, of a modifying polycarboxylic acid compound, the amount of polycarboxylic acid anhydride must, of course, be correspondingly decreased. Thus, it has been discovered that useful compositions are obtainable by the addition to the diepoxide-anhydride systems of a polycarboxylic acid compound in an amount so as to provide from 0.0 to 1.0 carboxyl equivalents of acid compound per epoxy equivalent of diepoxide, and, therefor, $y$ will be a number in the range from 0.0 to 1.0. The sum of $x$ plus $y$ is not greater than 4.0, since it has been observed that resins obtained outside of the range are unsuitable because they are heterogeneous in composition. Furthermore, the ratio $$\frac{x}{y}$$

must be at least 1.0, since the polycarboxylic acid anhydride is a major component of the system.

It has been discovered that on heating the modified or unmodified halogenated diepoxide-polycarboxylic acid anhydride systems in the presence or absence of a catalyst that rigid, moldable, solid, halogenated polyester type compositions can be obtained. On further application of heat, these compositions are converted into hard, water-resistant, infusible, scratch-resistant resins having superior high temperature characteristics making them suitable for use in industrial applications where high heat distortion points are a prime requisite such as, for example, in laminates and moldings subject to high temperature uses. A further unexpected utility of the novel resins are their flame-resistant characteristic.

In one embodiment the above cured resin compositions preferably contain a plurality of interconnecting units corresponding to the general formula:

VI

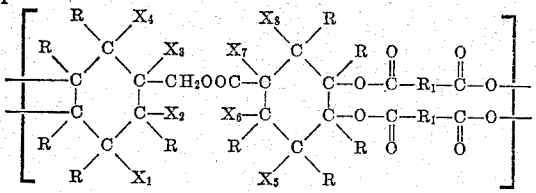

wherein each R and $X_1$ through $X_8$ have the same meanings as shown in Formula I above, and $R_1$ represents the residue of a dicarboxylic acid anhydride.

A still further embodiment of this invention is directed to polymerizable, curable compositions comprising (1) a halogenated diepoxide compound of the type characterized by Formula I above, and (2) a polycarboxylic acid compound in an amount so as to provide from about 0.1 to 1.5 carboxyl groups of polycarboxylic acid compound per epoxy group of diepoxide. It has further been discovered that these halogenated diepoxide-poly-carboxylic acid compound systems can be further modified, so as to obtain a variety of useful physical properties, by the inclusion or addition of a polycarboxylic acid anhydride in an amount so as to provide up to 1.0 carboxyl group of anhydride per epoxy group of diepoxide.

The polymerizable, curable halogenated diepoxide-polycarboxylic acid compound system, modified or unmodified with a polycarboxylic acid anhydride, can be expressed as compositions comprising (1) a halogenated diepoxide of the type characterized by Formula I above, (2) a polycarboxylic acid compound in an amount having $y$ carboxyl equivalents per epoxy equivalent of said diepoxide, and (3) a polycarboxylic acid anhydride in an amount having $x$ carboxyl equivalents per epoxy equivalent of said diepoxide, wherein $y$ is a number in the range from about 0.1 to 1.5, preferably from about 0.4 to 1.0; $x$ is a number in the range from 0.0 to 1.0, preferably from 0.0 to 0.5; the sum of $x$ and $y$ is not greater than 2.0, preferably not greater than 1.0; and $x/y$ is less than 1.0. It has been found that the sum of $x$ plus $y$ is not greater than 2.0 since resins obtained outside of this range are unsuitable because they are heterogenous in nature. Moreover, the ratio of $x/y$ must be less than 1.0 since the polycarboxylic acid compound is a major component of the system.

The modified or unmodified, polymerizable, curable halogenated diepoxide-polycarboxylic acid compound systems can be cured by heating, in the presence or absence of a catalyst, to form useful resin products having utility in the field of coatings, moldings, laminates, adhesives and the like. A further desirable characteristic of many of these resins is their self-extinguishing property which makes them useful for application in fields which require non-flammable equipment.

Preferred modified or unmodified, cured halogenated diepoxide-polycarboxylic acid compound systems contain a plurality of interconnecting units corresponding to the general formula:

VII

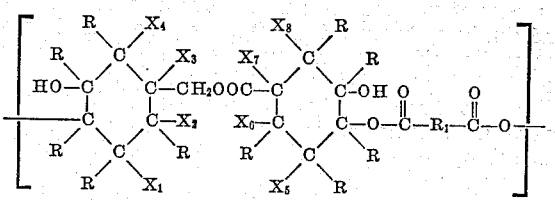

wherein each R and $X_1$ through $X_8$ have the same meanings as shown in Formula I above and $R_1$ represents the residue of a dicarboxylic acid.

It will be noted in Formulas VI and VII that at each epoxide site in the starting material there is made available a site for initiation of a linear type chain and also makes available another site for cross-linking purposes. The cross-linking can be accomplished by reaction with other epoxides such as diepoxides and polyepoxides, dibasic acids and the like.

The initial halogenated diepoxide-polycarboxylic acid anhydride or halogenated diepoxide-polycarboxylic acid compound systems, either modified or unmodified, are fluid, having viscosities in many instances less than 400 centipoises at working temperatures, i.e., 25° C. The reaction rate and physical properties are equally as good as, if not better than, commercially available epoxide systems.

The polycarboxylic acid anhydrides which can be used in preparing the novel compositions include aliphatic, aromatic and cycloaliphatic anhydrides. The preferred anhydrides are the dicarboxylic acid anhydrides and preferably the hydrocarbon dicarboxylic acid anhydrides which include, for example, phthalic anhydride, tetrahydrophthalic anhydride, hexahydrophthalic anhydride, chlorendic anhydride, maleic anhydride, chloromaleic anhydride, dichloromaleic anhydride, glutaric anhydride, adipic anhydride, succinic anhydride, itaconic anhydride, heptylsuccinic anhydride, hexylsuccinic anhydride, methylbutylsuccinic anhydride, methyltetrahydrophthalic anhydride, n-nonenylsuccinic anhydride, octenylsuccinic anhydride, pentenylsuccinic anhydride, propylsuccinic anhydride, citraconic anhydride, 4-nitrophthalic anhydride, 1,2-naphthalic anhydride, 2,3-naphthalic anhydride, 1,8-naphthalic anhydride, tetrabromophthalic anhydride, tetraiodophthalic anhydride. Mixtures of anhydrides, polymeric anhydrides, or mixed polymeric anhydrides of sebacic, adipic, pimelic, cyclohexane-1,4-dicarboxylic, terephthalic and isophthalic acids are also useful in preparing the novel compositions. Polycarboxylic acid dianhydrides such as 1,2,4,5-benzenetetracarboxylic dianhydride also can be employed with desirable results.

Polycarboxylic acid compounds which are useful in preparing the novel compositions include aliphatic, aromatic and cycloaliphatic dicarboxylic acids such as, for example, oxalic acid, malonic acid, succinic acid, glutaric acid, adipic acid, pimelic acid, suberic acid, azelaic acid, sebacic acid, alkylsuccinic acids, alkenylsuccinic acids, maleic acid, fumaric acid, itaconic acid, citraonic acid, mesaconic acid, glutaconic acid, muconic acid, ethylidenemalonic acid, isopropylidenemalonic acid, allylmalonic acid, 1,2-cyclohexanedicarboxylic acid, 1,4-cyclohexanedicarboxylic acid, 2-carboxy - 2 - methyl-cyclohexaneacetic, phthalic acid, isophthalic acid, terephthalic acid, 1,8-naphthalenedicarboxylic acid, 3-carboxycinnamic acid, 1,2-naphthalene dicarboxylic acid and tetrahydrophthalic acid. Preferred aliphatic dicarboxylic acids include aliphatic dibasic acids containing from five through ten carbon atoms. Other suitable polycarboxylic acid compounds include tricarboxylic acids such as 1,1,5-pentanetricarboxylic acid, 1,2,4-hexane-tricarboxylic acid, 2-propyl-1,2,4-pentanetricarboxylic acid, 5-octene-3,3,6-tricarboxylic acid, 1,2,3-propane-tricarboxylic acid, 1,2,4-benzenetricarboxylic acid and the like. Mixtures of polycarboxylic acids can be employed if desired.

Among the polycarboxylic acid compounds which can also be used in the compositions are compounds containing ester groups and more than one free carboxy group, and can be aptly termed polycarboxy polyesters of polycarboxylic acids, such as those previously listed, or the corresponding anhydrides of said acids, esterified with polyhydric alcohols. By the term "polycarboxy polyester," as used herein, is meant a polyester containing more than one carboxy group per molecule. These polycarboxy polyesters can be prepared by known condensation procedures, employing mole ratios favoring greater than equivalent amounts of polycarboxylic acid or anhydride. More specifically, the amount of polycarboxylic acid or anhydride employed in the esterification reaction should contain more carboxy groups than are required to react with the hydroxyl groups of the amount of polyhydric alcohol present. In forming polycarboxy polyesters that are useful in the compositions of this invention, it is preferable to use polycarboxylic acids or anhydrides, such as those previously named.

Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, 1,5-pentanediol, 2,4-pentanediol, 2,2-dimethyltrimethylene glycol, 1,4-hexanediol, 1,5-hexanediol, 1,6-hexanediol, 2,5-hexanediol, 3-methyl-1,5-pentanediol, 2-methyl-2,5-pentanediol, 3-methyl-2,5-pentanediol, 2,2-diethyl-1,3-propanediol, 2-ethyl-1,3-hexanediol, 2,5-dimethyl-2,5-hexanediol, 1,12-octadecanediol, 1-butene-3,4-diol, 2-butene-1,4-diol, 2-butyne-1,4-diol, 2,5-dimethyl-3-hexyne-2,5-diol, and the like; trihydric alcohols such as glycerol, trimethylolmethane, 1,2,6-hexanetriol, 1,1,1-trimethylolpropane, and the like; tetrahydric alcohols such as pentaerythritol, diglycerol, and the like; and higher polyhydric alcohols such as pentaglycerol, dipentaerythritol, polyvinyl alcohols and the like. Other polyhydric compounds can be prepared by the reaction of epoxides, e.g., diglycidyl ethers of bis-(4-hydroxyphenyl)-2,2'-propane, and reactive hydrogen-containing organic compounds, e.g. amines, polycarboxylic acids, polyhydric compounds and the like. In forming polycarboxy polyesters that can be employed in the novel polycarboxy polyesters compositions it is preferable to use dihydric, trihydric or tetrahydric, aliphatic or oxa-aliphatic alcohols.

The mole ratios in which the polycarboxylic acid or anhydride can be reacted with polyhydric compounds in preparing polycarboxy polyesters useful in the compositions are those which provide polyesters having more than one free carboxy group per molecule. In the case of trifunctional and tetrafunctional reactants in the esterification reaction, the mole ratios of the respective reactants must be such as to avert gelation. The mole ratio ranges of dicarboxylic acid to polyhydric compounds that have been found to provide polycarboxy polyesters which can be used in the compositions of this invention are presented in Table I.

TABLE I

| Polyhydric Compound | Mole Ratio of Dicarboxylic Acid or Anhydride to Polyhydric Compound |
|---|---|
| Trihydric Compound | 2.2 to 3.0 |
| Tetrahydric Compound | 3.3 to 4.0 |

It is preferred, however, to employ polycarboxy polyesters prepared from dicarboxylic acids or anhydrides and polyhydric compounds in the mole ratios specified in Table II:

TABLE II

| Polyhydric Compound | Mole Ratio of Dicarboxylic Acid or Anhydride to Polyhydric Compound |
|---|---|
| Trihydric Compound | 2.5 to 3.0 |
| Tetrahydric Compound | 3.5 to 4.0 |

The polycarboxylic polyesters described above can be obtained by condensing, in accordance with known procedures, a polyhydric compound and a polycarboxylic acid or anhydride. This condensation reaction may be conducted for example, by heating the reactants to a temperature within the range from 100° C. to 200° C. with or without an acidic catalyst. Water formed by the condensation reaction may be removed by distillation. The course of the reaction may be followed by making acid number determinations and the reaction can be stopped when a suitable polycarboxy polyester has been obtained.

The above-exemplified polycarboxylic acid anhydrides and polycarboxylic acid compounds can be used as modifiers in the halogenated diepoxide—polycarboxylic acid compound and halogenated diepoxide—polycarboxylic acid anhydride systems, respectively, in the proportions set out previously.

The curable systems containing halogenated diepoxide and polycarboxylic acid anhydride or halogenated diepoxide and polycarboxylic acid anhydride, modified or unmodified as described previously, can be cured, in general, by heating to a temperature in the range from about 25° C. to about 250° C. The preferred minimum temperature is that temperature at which the particular reaction mixture forms a homogeneous mass. It has been observed that homogeneity results at a lower temperature with a reaction mixture comprising lower aliphatic acids and anhydrides such as glutaric acid and maleic anhydrides, than is the case with a reaction mixture comprising relatively higher-melting aliphatic acids and aromatic anhydrides such as adipic acid and phthalic anhydrides. The speed of cure depends upon the components comprising the reaction mixture, the temperature employed, the proportion of the components, and other factors. In general, a more rapid cure can be achieved by increasing the temperature. In general, complete cures can be obtained in thirty minutes to twenty-four hours and higher. It has also been observed that the heating times required for gelation to occur can be significantly reduced by the use of various catalysts to accelerate the reaction. Illustrative catalysts include both acids and bases such as sulfuric acid, stannic chloride, perchloric acid, pyridine, aniline, benzyldimethylamine, benzyltrimethylammonium hydroxide and dilute sodium hydroxide. A catalyst concentration in the range from about 0.01 to 5.0 weight percent, and higher, based on the weight of diepoxide, is effective.

It has been found that in certain instances that the polycarboxylic acid compound and also the polycarboxylic acid anhydride react so rapidly that a completely homogeneous mass cannot be formed prior to gelation. However, the acid compound or anhydride can be dissolved in a suitable organic solvent so that the reaction rate is appreciably decreased thus permitting the formation of a homogeneous mass.

The following examples are illustrative:

Example I
PREPARATION OF 1-CHLORO-3-CYCLOHEXENE-CARBOXALDEHYDE

A mixture of 405 grams of 41 weight percent 2-chloroacrolein in ethylene dichloride solution (1.85 moles contained), said solution containing 8 grams of hydroquinone inhibitor, and 200 grams of butadiene (3.7 moles), said butadiene containing 0.02 weight percent t-butylcatechol inhibitor, was heated in a glass-lined autoclave at 100° C. for three hours. The reaction mixture was fractionated under reduced pressure to obtain 1-chloro-3-cyclohexenecarboxaldehyde having these properties:

Boiling range _____ 50°–55° C./5 mm. of Hg.
N 30/D _____ 1.4837.
Specific gravity 20/20° C. __ 1.146.
Purity by analytical bromination _____ 97.8 percent.
Purity by chlorine analysis __ 100.0 percent.

58.1% C (theory 58.1%); 6.6% H (theory 6.2%). The yield was 78 percent based on 2-chloroacrolein.

Example II
PREPARATION OF (1-CHLORO-3-CYCLOHEXEN-1-YL)-METHYL 1-CHLORO-3-CYCLOHEXENECARBOXYLATE A mixture of 10 grams of aluminum isopropoxide catalyst and 50 grams of benzene was stirred at 25°–30° C. while 144.5 grams of 1-chloro-3-cyclohexenecarboxaldehyde (1 mole) were fed over a period of 5.5 hours. After a reaction period of 16 hours at 25° C., the reaction solution was treated with 100 milliliters of isopropyl ether and acidified with a solution of 17 milliliters of 37 percent hydrochloric acid dissolved in 100 milliliters of water. The aqueous layer was extracted with 50 milliliters of isopropyl ether. The oil and extract were combined and stripped to a kettle temperature of 110° C./7 mm. of Hg to obtain (1-chloro-3-cyclohexen-1-yl)methyl 1-chloro-3-cyclohexenecarboxylate as a residue product having these properties:

N 30/D _____ 1.5140.
Specific gravity 20/20° C. _____ 1.206.
Purity by analysis for chlorine _____ 98.0 percent.
Purity by analytical bromination ____ 100.0 percent.
Molecular weight by Menzies-Wright method _____ 269 (theory 289).

The yield was 87 percent.

Example III
PREPARATION OF (1-CHLORO-3,4-EPOXYCYCLOHEXAN-1-YL)METHYL 1-CHLORO-3,4-EPOXYCYCLOHEXANE-CARBOXYLATE While 754 grams of (1-chloro-3-cyclohexen-1-yl)-methyl 1-chloro-3-cyclohexanecarboxylate (2.61 moles) were stirred at 25°–30° C., 2588 grams of 18.4 weight percent peracetic acid in ethyl acetate solution (6.26 moles contained) were fed over a period of 80 minutes. After a reaction period of 19 hours at 25° C., the mixture was stripped to a kettle temperature of 70° C./8 mm. of Hg to obtain (1-chloro-3,4-epoxycyclohexan-1-yl)methyl 1-chloro-3,4-epoxycyclohexanecarboxylate having these properties:

N 30/D _____ 1.5088.
Purity by analysis for epoxide _____ 86.6 percent.
Doubly unsaturated starting material by analytical bromination _____ 1.1 percent.
Yield (based on the epoxide analysis) ____ 87 percent.

Example IV
PREPARATION OF 1-BROMO-3-CYCLOHEXANE-CARBOXALDEHYDE

A mixture of 537 grams of 36.2 weight percent 2-bromoacrolein in carbon tetrachloride solution (1.41 moles contained), said solution containing 2 grams of hydroquinone inhibitor, and 159 grams of butadiene (2.95 moles), said butadiene containing 0.02 weight percent t-butylcathechol inhibitor, was heated at 100° C. in a glass-lined autoclave for three hours. The crude product was fractionated under reduced pressure to obtain 1-bromo-3-cyclohexenecarboxaldehyde having these properties:

Boiling range _____ 72°–75° C./4 mm. of Hg.
N 30/D _____ 1.5187.
Specific gravity 20/20° C. __ 1.465.
Purity by analytical bromination _____ 98.2 percent.
Purity by bromine analysis _____) 100.8 percent.
Yield (based on 2-bromoacrolein) _____ 57 percent.

Example V
PREPARATION OF (1-BROMO-3-CYCLOHEXEN-1-YL)-METHYL 1-BROMO-3-CYCLOHEXENE-CARBOXYLATE A solution of 18 grams of aluminum isopropoxide catalyst (0.26 equivalent) and 80 grams of benzene was stirred at 25°–30° C. while 275 grams of 1-bromo-3-cyclohexencarboxaldehyde (1.455 moles) was fed over a period of three hours. After 20 hours at 25° C., the mixture was acidified with a solution of 30 milliliters of 37 percent hydrochloric acid in 200 milliliters of water. The aqueous layer was separated and extracted with 100 milliliters of isopropyl ether. The oil and extract were combined and stipped to a kettle temperature of 80° C./3 mm. of Hg to obtain (1-bromo-3-cyclohexen-1-yl)methyl 1-bromo-3-cyclohexenecarboxylate as a viscous residue product having these properties:

N 30/D _____ 1.5448.
Purity by analytical bromination ____ 91.4 percent.
Molecular weight by the Menzies-Wright method _____ 308 (theory 377.8).
Yield of residue product based on the bromoaldehyde _____ 82 percent.

Example VI
PREPARATION OF (1-BROMO-3,4-EPOXYCYCLO-HEXAN-1-YL)METHYL 1-BROMO-3,4-EPOXYCYCLO-HEXANE-CARBOXYLATE A solution of 216 grams of the residue product ester described in Example V (0.572 mole) and 100 milliliters of ethyl acetate was stirred at 25°–30° C. while 561 grams of 18.6 weight percent peracetic acid in ethyl acetate solution (1.373 moles) were fed over a period of 1.5 hours. After a reaction period of 22 hours at 25° C., analysis for peracetic acid showed that 1.06 moles of peracetic acid had reacted. The mixture was stripped to a kettle temperature of 80° C./5 mm. of Hg to obtain 236 grams of residue product which was a viscous syrup at 80° C. and was glassy at 25° C. This product had the following properties:

Purity by bromine analysis _____ 97.3 percent.
Purity by analysis for epoxide ___ 57.0 percent.
Molecular weight by the Menzies-
 Wright method _____ 570 (theory 409.8).

These results indicated that some of the epoxide groups had polymerized.

Example VII
PREPARATION OF 1-CHLORO-2-METHYL-4-CYCLO-HEXENECARBOXALDEHYDE A mixture of 344 grams of 2-chlorocrotonaldehyde (contained 3.4 grams of hydroquinone inhibitor) and 356 grams of inhibited butadiene (contained 0.02 weight percent t-butylcatechol inhibitor) was heated at 150° C. in a glass-lined autoclave for three hours. The crude product was fractionated under reduced pressure to obtain two fractions of 1-chloro-2-methyl-4-cyclohexenecarboxaldehyde having the properties listed in Table I.

TABLE I

| Fraction | Boiling Range at 0.5 mm., ° C. | N 30/D | Sp. G. 20/20° | Percent Purity [1] | Percent Purity [2] |
|---|---|---|---|---|---|
| 3 | 50-56 | 1.4828 | 1.114 | 93.4 | 107.5 |
| 4 | 56-98 | 1.4868 | 1.119 | 96.6 | 104.8 |

[1] Determined by analytical bromination.
[2] Determined by analysis for chlorine.

Infrared and mass spectrographic studies on fractions 3 and 4 confirmed that they were predominantly 1-chloro-2-methyl-4-cyclohexenecarboxaldehyde. The wide boiling range was probably due to the presence of cis- and trans-isomers having different boiling points. Such isomers would result from the spatial arrangement of the chlorine, carbonyl and methyl groups relative to the plane of the ring.

The yield of 1-chloro-2-methyl-4-cyclohexenecarboxaldehyde was 31 percent and the efficiency was 50 percent based on 2-chlorocrotonaldehyde.

Example VIII
PREPARATION OF (1-CHLORO-2-METHYL-4-CYCLOHEXEN-1-YL)METHYL 1-CHLORO-2-METHYL-4-CYCLOHEXENE-CARBOXYLATE A mixture of 10 grams of aluminum isopropoxide catalyst (0.114 equivalents) and 40 grams of the benzene was stirred at 25° C. while 142 grams of fractions 3 and 4 of Example VII (0.896 mole) were fed over a period of 40 minutes. After a reaction period of 23 hours at 25° C., the solution was stirred at 25°–35° C. while a solution of 17 milliliters of 37 percent hydrochloric acid in 100 milliliters of water was fed thereto. The aqueous layer was separated and extracted with 50 milliliters of benzene. The oil and extract were combined and stripped to a kettle temperature of 100° C./1.5 mm. of Hg to obtain (1-chloro-2-methyl-4-cyclohexene-1-yl)methyl 1-chloro-2-methyl-4-cyclohexenecarboxylate having these properties:

N 30/D _____ 1.5138
Molecular weight by the Menzies-
 Wright method _____ 282 (theory 317).
Purity by analytical bromination ____ 86.6 percent.

The yield was 45 percent at an efficiency of 90 precent.

Example IX
PREPARATION OF (1-CHLORO-2-METHYL-4,5-EPOXYCYCLOHEXAN-1-YL)METHYL 1-CHLORO-2-METHYL-4,5-EPOXYCYCLOHEXANECARBOXYLATE A solution of 51 grams of (1-chloro-2-methyl-4-cyclohexen-1-yl)methyl 1-chloro-2-methyl-4-cyclohexenecarboxylate (0.161 mole) in 50 milliliters of ethyl acetate was stirred at 25° C. while 118 grams of 23 weight percent peracetic acid in ethyl acetate solution (0.354 mole) was fed over a period of two hours. After a reaction period of 20 hours at 25° C., the solution contained 0.09 mole of peracetic acid by analysis. The solution was diluted with 200 grams of ethylbenzene and stripped to a kettle temperature of 70° C./6 mm. of Hg to obtain (1 - chloro - 2 - methyl - 4,5 - epoxycyclohexan - 1 - yl)-methyl 1-chloro-2-methyl-4,5-epoxycyclohexanecarboxylate having these properties:

N 30/D _____ 1.5160.
Purity by analysis for chlorine _____ 103.5 percent.
Purity by analysis for epoxide with
 HBr _____ 53.4 percent.
Molecular weight by the Menzies-
 Wright method _____ 347 (theory 349).

The yield of residue product was 89 percent.

Example X

Approximately 2.17 grams of (1-chloro-3,4-epoxycyclohexan-1-yl)-methyl 1-chloro-3,4-cyclohexanecarboxylate and about 1.11 grams of phthalic anhydride were mixed in a glass tube in amounts so as to provide 1.5 carboxyl groups of anhydride per epoxy group of diepoxide (equivalent weight of the diepoxide determined by epoxide analysis to be 217). One drop of 12.5 weight percent benzyldimethylamine in ethyl acetate (a catalyst concentration of about 0.06 weight percent based on the weight of epoxy-hardener mixture) was added to the mixture, and heat was applied until the system was homogeneous below about 120° C. The temperature was then maintained at 120° C. for 2.5 hours plus 6 hours at 160° C. The resulting brown-colored resin had a Barcol hardness of 45.

Example XI

Approximately 10.0 grams of (1-chloro-3,4-epoxycyclohexan-1-yl)-methyl 1-chloro-3,4-epoxycyclohexanecarboxylate and about 0.1 gram of boron trifluoride-piperidine complex were mixed and heated until homogeneous (below about 80° C.). The temperature was then maintained at 80° C. for 5.5 hours plus two hours at 120° C. and for six hours at 160° C. The resulting hard, brown-colored resin was fire resistant (self-extinguishing).

Example XII

Approximately 3.38 grams of 1-bromo-3,4-epoxycyclohexyl-methyl 1 - bromo - 3,4 - epoxycyclohexanecarboxylate and about 1.48 grams of phthalic anhydride were mixed in amounts so as to provide one epoxide group of diepoxide to one carboxyl group of anhydride. One drop of 20 weight percent potassium hydroxide in methanol was added to the mixture (a catalyst concentration of about 0.08 weight percent based on the weight of diepoxide and anhydride). The resulting mixture was heated until homogeneous (below about 120° C.), and maintained at 120° C. for six hours plus six hours at 160° C. The resulting resin product was black and firm.

Example XIII

Approximately 5.54 grams of 1-chloro-3,4-epoxy-6-methylcyclohexylmethyl 1 - chloro - 3,4 - epoxy - 6 - methylcyclohexanecarboxylate and about 1.48 grams of phthalic anhydride were mixed in amounts so as to provide 1.0 carboxyl group of anhydride per epoxy group of diepoxide. One drop of 20 weight percent potassium hydroxide in ethylene glycol was used as a catalyst (catalyst concentration of about 0.06 weight percent based on the weight of epoxide and anhydride). The resulting mixture was heated until homogeneous (below about 120° C.), and then maintained at 120° C. for 29 hours. The resulting resin product was dark brown in color and brittle.

Example XIV

A mixture containing 1.8 grams of (1-chloro-3,4-epoxycyclohexan - 1 - yl)methyl 1 - chloro - 3,4 - epoxycyclohexanecarboxylate, 0.56 gram of phthalic anhydride, and 0.36 gram of adipic acid, was prepared. This mixture provided 0.75 carboxyl group of anhydride and 0.5 carboxyl group of acid per epoxy group of diepoxide. The resulting mixture was heated to a temperature of 120° C. and maintained thereat for three hours. Subsequently, a post cure was effected at 160° C. for six hours. A brown, brittle product was obtained.

*Example XV*

A mixture containing 1.8 grams of (1-chloro-3,4-epoxycyclohexan - 1 - yl) methyl 1 - chloro - 3,4 - epoxycyclohexanecarboxylate, 0.47 gram of glutaric acid, and 0.25 gram of maleic anhydride was prepared. This mixture provided 0.75 carboxyl group of acid and 0.5 carboxyl group of anhydride per epoxy group of diepoxide. The resulting mixture was heated to a temperature of 120° C. and maintained thereat for three hours. Subsequently, a post cure was effected at 160° C. for six hours. A brown brittle product was obtained.

Reasonable variations and modifications of this invention can be made or carried out in the light of the above disclosure without departing from the spirit and scope thereof.

What is claimed is:

1. A solid homopolymer of a compound having the formula:

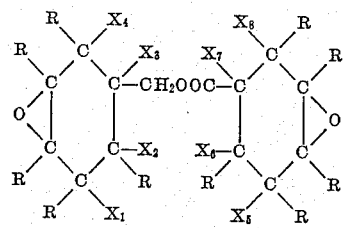

wherein each R is individually selected from the group consisting of hydrogen and an alkyl radical having from 1 to 4 carbon atoms; $X_1$ through $X_8$ are selected from the group consisting of hydrogen, halogen and an alkyl radical having from 1 to 4 carbon atoms; and at least one of the variables designated as $X_1$ through $X_8$ always being a halogen.

2. A solid homopolymer of chloro-substituted (3,4-epoxycyclohexan - 1 - yl)methyl 3,4 - epoxycyclohexanecarboxylate wherein no more than one chloro substituent is monovalently bonded to any one carbon atom, other than the epoxy carbon atoms, which constitute the carbocyclic rings of said chloro-substituted (3,4-epoxycyclohexan - 1 - yl)methyl 3,4 - epoxycyclohexanecarboxylate.

3. A solid homopolymer of bromo-substituted (3,4-epoxycyclohexan - 1 - yl)methyl 3,4 - epoxycyclohexanecarboxylate wherein no more than one bromo substituent is monovalently bonded to any one carbon atom, other than the epoxy carbon atoms, which constitute the carbocyclic rings of said bromo-substituted (3,4-epoxycyclohexan-1-yl)methyl 3,4-epoxycyclohexanecarboxylate.

4. A solid homopolymer of (1-chloro-3,4-epoxycyclohexan-1-yl) methyl 1-chloro-3,4-epoxycyclohexanecarboxylate.

5. A solid homopolymer of (2-chloro-3,4-epoxycyclohexan - 1 - yl)methyl 2 - chloro - 3,4 - epoxycyclohexanecarboxylate.

6. A solid homopolymer of (5-chloro-3,4-epoxycyclohexan - 1 - yl)methyl 5 - chloro - 3,4 - epoxycyclohexanecarboxylate.

7. A solid homopolymer of (1-bromo-3,4-epoxycyclohexan - 1 - yl)methyl 1 - bromo - 3,4 - epoxycyclohexanecarboxylate.

8. A solid homopolymer of (1-chloro-2-methyl-4,5-epoxycyclohexan - 1 - yl)methyl 1 - chloro - 2 - methyl - 4,5-epoxycyclohexanecarboxylate.

9. A solid resin obtained by contacting a diepoxide represented by the general formula:

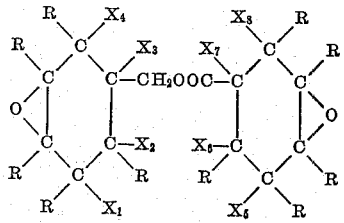

wherein each R is individually selected from the group consisting of hydrogen and an alkyl radical having from 1 to 4 carbon atoms; $X_1$ through $X_8$ are selected from the group consisting of hydrogen, halogen, and an alkyl radical having from 1 to 4 carbon atoms; and at least one of the variables designated as $X_1$ through $X_8$ always being a halogen; with a polycarboxylic acid anhydride; in such relative amounts as to provide from about 0.1 to 4.0 carboxyl groups of said anhydride for each epoxy group of said diepoxide; at a temperature in the range of from about 25° to 250° C.; and for a period of time sufficient to produce said solid resin.

10. A solid resin obtained by contacting a diepoxide represented by the general formula:

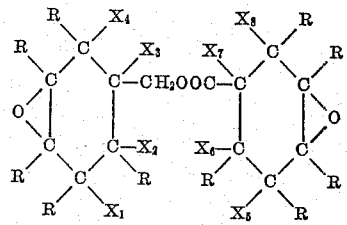

wherein each R is individually selected from the group consisting of hydrogen and an alkyl radical having from 1 to 4 carbon atoms; $X_1$ through $X_8$ are selected from the group consisting of hydrogen, halogen, and an alkyl radical having from 1 to 4 carbon atoms; and at least one of the variables designated as $X_1$ through $X_8$ always being a halogen; with a polycarboxylic acid compound selected from the group consisting of polycarboxylic acids and polycarboxy polyesters; in such relative amounts as to provide from about 0.1 to 1.5 carboxyl groups of said polycarboxylic acid compound for each epoxy group of said diepoxide; at a temperature in the range of from about 25° to 250° C.; and for a period of time sufficient to produce said solid resin.

References Cited in the file of this patent
UNITED STATES PATENTS

| | | |
|---|---|---|
| 2,515,758 | Cukier | July 18, 1950 |
| 2,716,123 | Frostick et al. | Aug. 23, 1955 |
| 2,736,730 | Kleiman | Feb. 28, 1956 |
| 2,739,161 | Carlson | Mar. 20, 1956 |